(12) United States Patent
Liu et al.

(10) Patent No.: US 11,481,490 B1
(45) Date of Patent: Oct. 25, 2022

(54) SYSTEMS AND METHODS FOR AUTOMATED LABELING OF SUBSCRIBER DIGITAL EVENT DATA IN A MACHINE LEARNING-BASED DIGITAL THREAT MITIGATION PLATFORM

(71) Applicant: Sift Science, Inc., San Francisco, CA (US)

(72) Inventors: Wei Liu, Seattle, WA (US); Ralf Gunter Correa Carvalho, Seattle, WA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/693,851

(22) Filed: Mar. 14, 2022

Related U.S. Application Data

(60) Provisional application No. 63/170,427, filed on Apr. 2, 2021.

(51) Int. Cl.
*G06F 21/55* (2013.01)
*G06N 5/02* (2006.01)

(52) U.S. Cl.
CPC ......... *G06F 21/554* (2013.01); *G06N 5/022* (2013.01); *G06F 2221/034* (2013.01)

(58) Field of Classification Search
CPC .. G06F 21/554; G06F 2221/034; G06N 5/022
See application file for complete search history.

(56) References Cited

U.S. PATENT DOCUMENTS

| 11,330,009 | B2* | 5/2022 | Liu | G06N 3/0454 |
| 2009/0044279 | A1* | 2/2009 | Crawford | G06F 21/6218 |
| | | | | 726/26 |
| 2018/0191750 | A1* | 7/2018 | Moradi | G06F 21/60 |
| 2019/0034807 | A1* | 1/2019 | Clark | G06K 9/6256 |
| 2019/0132205 | A1* | 5/2019 | Du | H04L 67/12 |
| 2022/0020027 | A1* | 1/2022 | Liu | H04L 63/1466 |
| 2022/0058505 | A1* | 2/2022 | Karlinsky | G06N 7/005 |
| 2022/0114345 | A1* | 4/2022 | Belém et al. | G06Q 40/02 |
| 2022/0114595 | A1* | 4/2022 | Balayan | G06N 3/0427 |

FOREIGN PATENT DOCUMENTS

| CA | 3063580 | A1 * | 6/2020 | G06N 20/00 |
| WO | WO 2021/249662 | A1 * | 12/2021 | G06Q 10/00 |

* cited by examiner

*Primary Examiner* — Christopher A Revak
(74) *Attorney, Agent, or Firm* — Chandler Scheitlin; Padowithz Alce; Alce PLLC

(57) ABSTRACT

A system and method for accelerating an automated labeling of a volume of unlabeled digital event data samples includes identifying a corpus characteristic of a digital event data corpus that includes a plurality of distinct unlabeled digital event data samples; selecting an automated bulk labeling algorithm based on the corpus characteristic associated with the digital event data corpus satisfying a bulk labeling criterion of the automated bulk labeling algorithm; evaluating a subset of the plurality of unlabeled digital event data samples, wherein evaluating the subset includes attributing a distinct classification label to each digital event data sample within the subset; and in response to the selection, executing the selected automated bulk labeling algorithm against the digital event data corpus, wherein the executing includes simultaneously assigning a classification label equivalent to the distinct classification label to a superset of the digital event data corpus that relates to the subset.

20 Claims, 3 Drawing Sheets

Sourcing Subscriber Digital Event Data Samples S210

Selecting an Automated Bulk Labeling Algorithm from a Plurality of Distinct Automated Bulk Labeling Algorithms S220

Executing the Selected Automated Bulk Labeling Algorithm S230

Presenting Labeled Digital Event Data Samples to Target Subscribers for Subscriber Verification S240

FIGURE 2

SYSTEMS AND METHODS FOR AUTOMATED LABELING OF SUBSCRIBER DIGITAL EVENT DATA IN A MACHINE LEARNING-BASED DIGITAL THREAT MITIGATION PLATFORM

CROSS-REFERENCE TO RELATED APPLICATIONS

This application claims the benefit of U.S. Provisional Application No. 63/170,427, filed 2 Apr. 2021, which is incorporated in its entirety by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a method for accelerating an automated labeling of a volume of unlabeled digital event data samples includes identifying one or more corpus characteristics or one or more corpus metrics of a digital event data corpus comprising a plurality of distinct unlabeled digital event data samples; selecting an automated bulk labeling algorithm of a plurality of distinct automated bulk labeling algorithms based on the one or more corpus characteristics or the one or more corpus metrics satisfying a bulk labeling criterion associated with one of the plurality of distinct automated bulk labeling algorithms; evaluating a subset of the plurality of distinct unlabeled digital event data samples, wherein evaluating the subset of the plurality of distinct unlabeled digital event data samples includes attributing a distinct classification label of a plurality of distinct classification labels to each distinct unlabeled digital event data sample within the subset; and in response to the selection, executing, by one or more computers, the selected automated bulk labeling algorithm against the digital event data corpus, wherein the executing includes: identifying the distinct classification label attributed to each distinct unlabeled digital event data sample within the subset; simultaneously assigning a classification label equivalent to the distinct classification label to an extrapolated superset of the digital event data corpus that relates to the subset, wherein each distinct unlabeled digital event data sample of the extrapolated superset shares at least one common digital event data attribute with each distinct unlabeled digital event data sample of the subset; and constructing a labeled digital event data corpus that includes each distinct unlabeled digital event data sample of the subset, each distinct unlabeled digital event data sample of the extrapolated superset, and the classification label corresponding to each distinct unlabeled digital event data sample of the subset and the extrapolated superset.

In one embodiment, the method includes that each of the plurality of distinct automated bulk labeling algorithms include a set of computer instructions that, when executed, executes an automated sequence of tasks that automatically assigns at least one classification label to each digital event data sample of a volume of digital event data samples or a target corpus of digital event data samples.

In one embodiment, the method includes the one or more corpus characteristics or the one or more corpus metrics associated with the digital event data corpus satisfies the bulk labeling criterion of an automated connected component graph bulk labeling algorithm, and the bulk labeling criterion is satisfied based on determining that a collection of the plurality of distinct unlabeled digital event data samples comprise a plurality of distinct digital event attribute values of a first type that are digitally linked to a distinct digital event attribute value of a second type.

In one embodiment, the method includes the one or more corpus characteristics or the one or more corpus metrics associated with the digital event data corpus satisfies the bulk labeling criterion of an automated connected component graph bulk labeling algorithm, and the bulk labeling criterion is satisfied based on the plurality of distinct unlabeled digital event data samples of the digital event data corpus corresponding to a suspected automated fraud attack.

In one embodiment, the method includes the one or more corpus characteristics or the one or more corpus metrics associated with the digital event data corpus satisfies the bulk labeling criterion of an automated digital event embeddings-based bulk labeling algorithm, and the bulk labeling criterion is satisfied based on the plurality of distinct unlabeled digital event data samples of the digital event data corpus corresponding to a probable digital abuse type.

In one embodiment, the method includes the one or more corpus characteristics or the one or more corpus metrics associated with the digital event data corpus satisfies the bulk labeling criterion of an automated digital event embeddings-based bulk labeling algorithm, and the bulk labeling criterion is satisfied based on the digital event data corpus exceeding a service-defined corpus size threshold.

In one embodiment, the method includes that the digital event data corpus includes a first set of unlabeled digital event data samples corresponding to a first distinct subscriber of the machine learning-based digital threat mitigation service; a second set of labeled digital event data samples corresponding to a second distinct subscriber of the machine learning-based digital threat mitigation service; and a third set of unlabeled digital event data samples corresponding to a third distinct subscriber of the machine learning-based digital threat mitigation service.

In one embodiment, the method includes the one or more corpus characteristics or the one or more corpus metrics associated with the digital event data corpus satisfies the bulk labeling criterion of an automated context-based bulk labeling algorithm, and the bulk labeling criterion is satisfied based on the digital event data corpus comprising a plurality of labeled digital event data samples that exceeds a service-defined threshold value.

In one embodiment, the method includes one of the one or more corpus characteristics used to automatically select the automated bulk labeling algorithm corresponds to a suspected digital fraud type criterion.

In one embodiment, the method includes the automated bulk labeling algorithm includes an automated connected component graph bulk labeling algorithm that updates a connected component graph based on the digital event data corpus, wherein the connected component graph includes a plurality of distinct connected component dusters, wherein at least one of the plurality of distinct connected component clusters includes a plurality of distinct user nodes, wherein each distinct user node of the plurality of distinct user nodes corresponds to a distinct user identification value derived from the digital event data corpus; and a plurality of distinct internet protocol-based edges that graphically connects one or more pairs of distinct user nodes together via one or more of the plurality of distinct internet protocol-based edges.

In one embodiment, the method includes evaluating the subset of the digital event data corpus includes evaluating a subset of one of the plurality of distinct connected component clusters of the connected component graph; and evaluating the subset of the one of the plurality of distinct connected component clusters further includes displaying, on a web-based user interface of the machine learning-based digital threat mitigation service, the one of the plurality of distinct connected component clusters of the connected component graph, and while displaying the one of the plurality of distinct connected component dusters of the connected component graph, attributing the distinct classification label to a distinct subset of the plurality of distinct user nodes of the one of the plurality of distinct connected component clusters.

In one embodiment, the method includes the automated bulk labeling algorithm includes a connected component graph algorithm that updates a connected component graph based on the digital event data corpus; the connected component graph includes a plurality of distinct connected component dusters, wherein each distinct connected component cluster of the plurality of distinct connected component clusters includes a plurality of unlabeled digital event data samples graphically connected together; the evaluating the subset of the digital event data corpus includes evaluating a subset of one of the plurality of distinct connected component dusters; and the method further includes: displaying, on a web-based user interface of the machine learning-based digital threat mitigation service, the one of the plurality of distinct connected component clusters, and while displaying the one of the plurality of distinct connected component clusters, attributing the distinct classification label to each unlabeled digital event data sample included in the subset of the one of the plurality of distinct connected component clusters.

In one embodiment, the method includes evaluating the subset of the digital event data corpus includes identifying a predetermined quantity of unlabeled digital event data samples by randomly sampling the digital event data corpus and evaluating the predetermined quantity of unlabeled digital event data samples.

In one embodiment, the method includes the plurality of unlabeled digital event data samples corresponds to a plurality of distinct digital event data sequences; and the method further includes implementing a digital event-based embeddings neural network that generates a digital event embeddings representation based on receiving, as input, one of the plurality distinct digital event data sequences.

In one embodiment, the method includes evaluating the subset of the digital event data corpus includes evaluating the digital event embeddings representation, wherein evaluating the digital event embeddings representation includes querying a plurality of distinct clusters of digital event sequence embeddings based on the digital event embeddings representation; and attributing the distinct classification label indicating digital abuse if one or more distinct clusters of digital event sequence embeddings corresponding to digital abuse is returned based on the querying or attributing the distinct classification label indicating not digital abuse if one or more distinct clusters of digital event sequence embeddings corresponding to not digital abuse is returned based on the querying.

In one embodiment, the method includes training one or more production-implemented machine learning-based models of a machine learning-based digital threat mitigation service with batches of labeled training data sourced from the labeled digital event data corpus.

In one embodiment, the method includes displaying, on a web-based user interface of the machine learning-based digital threat mitigation service, one or more selective subsets of labeled digital event data samples sourced from the labeled digital event data corpus, wherein the displaying includes only displaying the one or more selective subsets of labeled digital event data samples that corresponds to a target subscriber accessing the web-based user interface; and while displaying the one or more selective subsets of labeled digital event data samples sourced from the labeled digital event data corpus, receiving a verification input data signal from the target subscriber confirming or disconfirming the classification label assigned to the one or more selective subsets of labeled digital event data samples by the automated bulk labeling algorithm.

In one embodiment, a method for accelerating an automated labeling of a volume of unlabeled digital event data samples includes computing one or more corpus metrics of a digital event data corpus comprising a plurality of distinct unlabeled digital event data samples, wherein at least one of the one or more computed corpus metrics informs a probable degree of digital fraud risk associated with the digital event data corpus; selecting an automated bulk labeling algorithm of a plurality of distinct automated bulk labeling algorithms based on the one or more corpus metrics satisfying a bulk labeling criterion associated with one of the plurality of distinct automated bulk labeling algorithms; in response to selecting the automated bulk labeling algorithm, executing, by one or more computers, the selected automated bulk labeling algorithm against the digital event data corpus, wherein the executing includes simultaneously assigning to each distinct unlabeled digital event data sample of the plurality of distinct unlabeled digital event data samples of the digital event data corpus, a classification label of one of a first label indicating digital abuse based on the probable degree of digital fraud risk satisfying a predetermined threat threshold value and a second classification label indicating not digital abuse based on the probable degree of digital fraud risk not satisfying the predetermined threat threshold value; and constructing a labeled digital event data corpus that includes the plurality of distinct unlabeled digital event data samples and the classification label corresponding to each of the plurality of distinct unlabeled digital event data samples.

In one embodiment, the method includes training one or more production-implemented machine learning-based models of the machine learning-based digital threat mitigation service with batches of labeled training data sourced from the labeled digital event data corpus.

In one embodiment, the method includes that the automated bulk labeling algorithm includes an automated connected component graph bulk labeling algorithm that includes a connected component graph, wherein the connected component graph includes a plurality of distinct connected component clusters; computing the one or more corpus metrics includes computing one or more connected component cluster metrics for at least one distinct connected component cluster of the plurality of distinct connected component clusters; and the method further includes displaying, on a web-based user interface of the machine learning-based digital threat mitigation service, the at least one distinct connected component cluster and the one or more connected component cluster metrics corresponding to the at least distinct connected component cluster; and while displaying the at least one distinct connected component cluster and the one or more connected component cluster metrics, simultaneously assigning the classification label to a plurality of unlabeled digital event data samples included in the at least one distinct connected component cluster.

In one embodiment, the method includes the at least one distinct connected component cluster corresponds to a plurality of distinct subscribers to the machine learning-based digital threat mitigation service.

In one embodiment, the method includes receiving a verification data signal from a target subscriber confirming or disconfirming a bulk labeling action algorithm associated with the classification label assignment to the plurality of distinct unlabeled digital event data samples via the execution of the automated bulk labeling algorithm.

In one embodiment, a method for accelerating an automated labeling of a volume of unlabeled data samples includes identifying one or more corpus characteristics or one or more corpus metrics of a data corpus comprising a plurality of distinct unlabeled data samples; selecting an automated bulk labeling algorithm of a plurality of distinct automated bulk labeling algorithms based on the one or more corpus characteristics or the one or more corpus metrics satisfying a bulk labeling criterion associated with one of the plurality of distinct automated bulk labeling algorithms; evaluating a subset of the plurality of distinct unlabeled data samples, wherein evaluating the subset of the plurality of distinct unlabeled data samples includes attributing a distinct classification label of a plurality of distinct classification labels to each distinct unlabeled data sample within the subset; and in response to the selection, executing, by one or more computers, the selected automated bulk labeling algorithm against the data corpus, wherein the executing includes identifying the distinct classification label attributed to each distinct unlabeled data sample within the subset; simultaneously assigning a classification label equivalent to the distinct classification label to an extrapolated superset of the data corpus that relates to the subset; and constructing a labeled data corpus that includes each distinct unlabeled data sample of the subset, each distinct unlabeled data sample of the extrapolated superset, and the classification label corresponding to each distinct unlabeled data sample of the subset and the extrapolated superset.

In one embodiment, the method includes wherein each of the plurality of distinct automated bulk labeling algorithms includes a distinct automated sequence of actions that, when executed, executes the distinct automated sequence of actions that automatically assigns at least one classification label to each data sample of a target volume of data samples or a target corpus of data samples.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
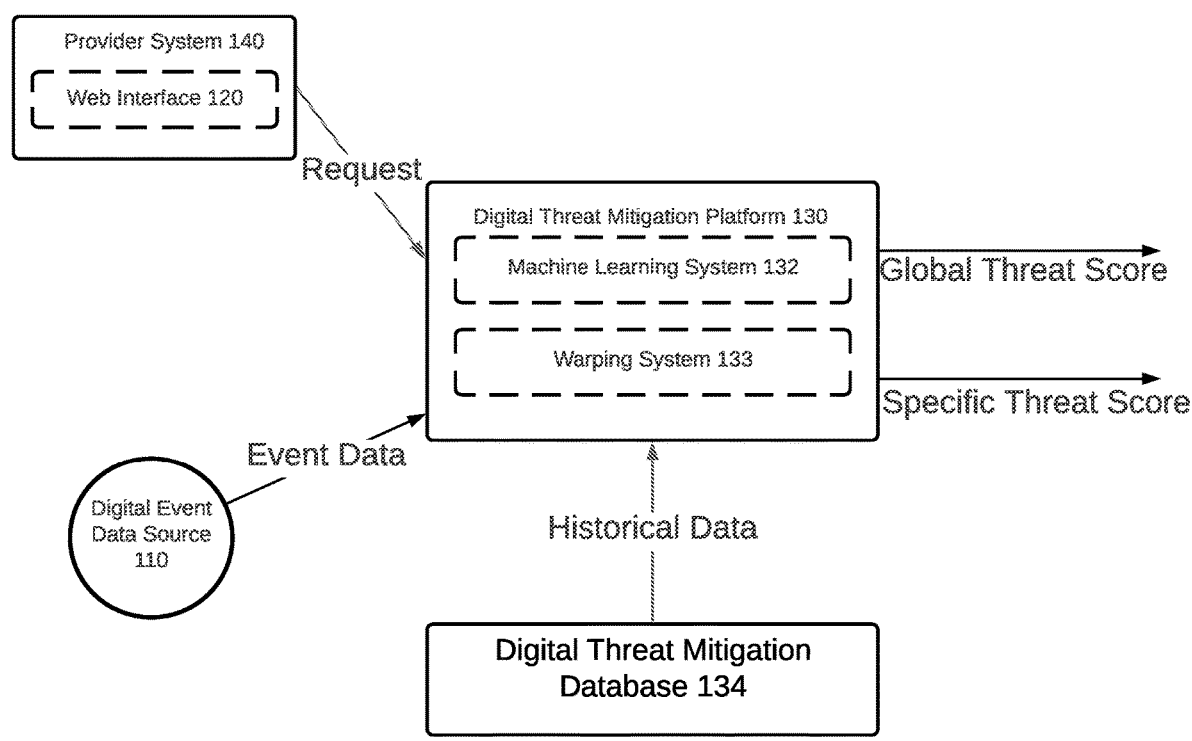
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

Additionally, or alternatively, in one or more embodiments of the present application, the advanced technology platform may be capable of accelerating a labeling of unlabeled digital event data samples. In such embodiments, the advanced technology platform may function to selectively identify and execute one or more automated bulk labeling algorithms that may function to automatically label unlabeled digital event data samples, in bulk, rather than on a per data sample basis and/or per subscriber basis.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELM0, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Figure 3:
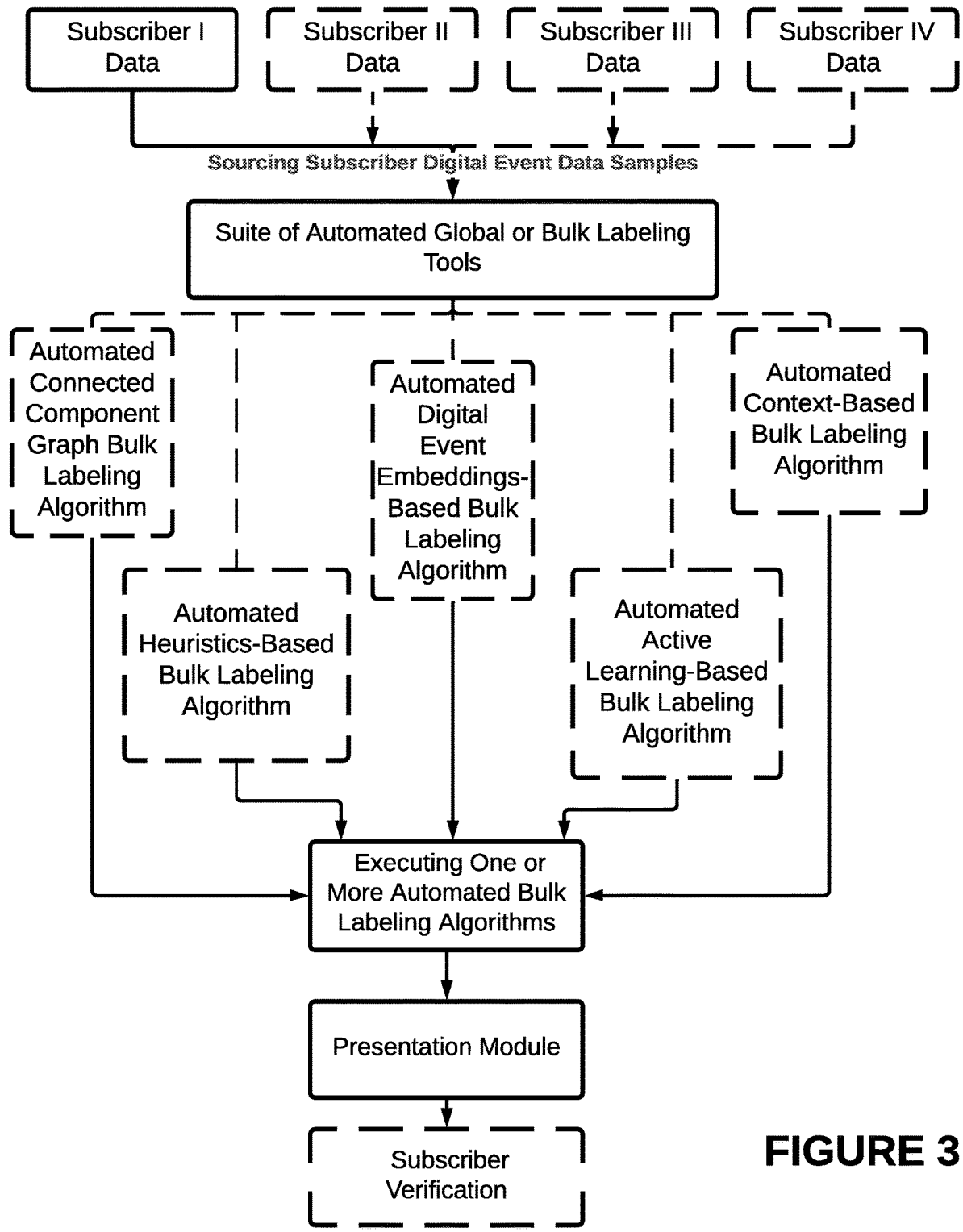
FIG. 3 illustrates an example schematic of global labeling subscriber digital event data in accordance with one or more embodiments of the present application.

Additionally, as shown in FIG. 2 and FIG. 3, the systems and methods described herein may implement the digital threat mitigation platform in accordance with the one or more embodiments described in the present application as well as in the one or more embodiments described in U.S.

patent application Ser. No. 15/653,373, which is incorporated by reference in its entirety.

2. Methods for Automated Bulk Labeling of Subscriber Digital Event Data and Intelligently Training One or More Machine Learning-Based Models As shown in FIG. 2, the method 200 for automated global (or bulk) labeling of subscriber digital event data samples may include sourcing digital event data samples associated with one or more subscribers S210, selecting an automated bulk labeling algorithm of a plurality of distinct automated bulk labeling algorithms S220, and executing the selected automated bulk labeling algorithm against the sourced digital event data samples associated with the one or more subscribers S230. The method 200 may optionally include transmitting a subscriber verification request for confirming or disconfirming the digital event data samples labeled by the automated bulk labeling algorithm S240.

2.10 Sourcing Subscriber Digital Event Data Samples

S210, which includes sourcing subscriber digital event data samples, may function to periodically or continuously source and/or identify digital event data samples from one or more environments of one or more subscribers to the machine learning-based digital threat mitigation platform. A digital event data sample, as generally referred to herein, may preferably relate to digital event data associated with a digital event or digital activity that may occur over the Internet, however, in one or more alternative embodiments, a digital event data sample may also include event data associated with events that may occur or may be initiated outside of the internet, in which, some part of the event involves the Internet.

In one or more embodiments, sourcing or identifying digital event data samples may preferably include identifying one or more event attributes (or event characteristics) associated with a subject digital event such as a first attribute (or characteristic) that may indicate the digital user (e.g., user identification, user account data, or the like) attempting to perform a subject digital event, a second attribute (or characteristic) that may indicate an email address of the digital user attempting to perform the subject digital event, a third attribute (or characteristic) that may indicate a shipping address provided by the digital user, a fourth attribute (or characteristic) that may indicate information about a credit card provided by the digital user, a fifth attribute (or characteristic) that may relate to an electronic device (e.g., device identification) involved in performing the subject digital event, a sixth attribute (or characteristic) that may relate to an IP address of the electronic device when the subject digital event was performed, a seventh attribute (or characteristic) that may relate to which user session the digital user performed the subject digital event (e.g., user session identification), and/or the like.

In one or more embodiments, S210 may function to construct a database that includes a digital event data corpus by sourcing subscriber digital event data samples (e.g., subscriber digital event data) associated with one or more subscribers to the machine learning-based digital threat mitigation service. In one or more embodiments, the database comprising the digital event data corpus may include a volume of unlabeled digital event data samples and/or a volume of labeled digital event data samples that may be associated with one or more subscriber to the machine learning-based digital threat mitigation service. It shall be noted that the digital event data corpus may function to provide the system 100 (implementing the method 200) a foundation for accelerating an automated labeling of at least a subset of the plurality of unlabeled digital event data samples included in the digital event data corpus.

In a first implementation, S210 may function to construct (or source) a digital event data corpus that may include a plurality of digital event data samples associated with a target subscriber. In such implementation, the digital event data corpus may include a volume of unlabeled digital event data samples (e.g., raw digital event data samples devoid of any data tags, data labels, data classifications, or the like) and/or a volume of labeled digital event data samples (e.g., digital event data samples associated with a data tag, a data label, or the like) that may correspond to only a single, distinct subscriber of the machine learning-based digital threat mitigation service. In such embodiments, the digital event data corpus may include (but not an exhaustive list of) one or more content-type digital event data samples, one or more transactional-type digital event data samples, one or more online order-type digital event data samples, one or more session-type digital event data samples corresponding to the single, distinct subscriber.

In a second implementation, S210 may function to construct (or source) a digital event data corpus that may comprise a plurality of digital event data samples corresponding to a plurality of distinct subscribers. In such implementation, S210 may function to construct (or source) a digital event data corpus comprising a first set of unlabeled digital event data samples corresponding to a first subscriber of the machine learning-based digital threat mitigation service and a second set of unlabeled digital event data samples corresponding to a second subscriber of the machine learning-based digital threat mitigation service. That is, the digital event data corpus may include a collection of digital event data samples (e.g., a volume of unlabeled digital event data samples, a volume of labeled digital event data samples, and/or combinations thereof) that may collectively be associated with a plurality of subscribers subscribing to the system 100 implementing the method 200.

In a third implementation, S210 may function to construct (or source) a digital event data corpus that may include a plurality of unlabeled digital event data samples associated with a plurality of distinct subscribers that may share at least one common digital fraud mitigation objective between each of the plurality of distinct subscribers. It shall be noted that, in one or more embodiments, a first set of subscribers utilizing the system 100 and/or the method 200 may define digital fraud activity that may be occurring on an online resource differently than a second set of subscribers utilizing the system 100 and/or the method 200 (e.g., fake (or inaccurate) digital accounts constructed on an online medium of a first subscriber may be deemed a critical type of fraud, however, however, fake (or inaccurate) digital accounts constructed on an online medium of a second subscriber may not be a critical fraud type). Accordingly, in such implementation, the digital event data corpus may include a plurality of digital event data samples (e.g., a plurality of unlabeled digital event data samples and/or a plurality of labeled digital event data samples) associated with a plurality of distinct subscriber that may share at least one common digital fraud mitigation objective.

It shall be noted that, in some embodiments, the unlabeled digital event data samples that may be included in the digital event data corpus may not have been previously labeled by the system 100 (implementing the method 200) or manually labeled by a human labeling analyst (e.g., internally, or externally to the subscriber). It shall be further noted that, in one or more embodiments, S210 may function to source subscriber digital event data (e.g., digital event data samples) based on one or more automated global labeling algorithms described herein.

Retrieving Subscriber Digital Event Data Samples

In one or more embodiments, S210 may function to collect subscriber digital event data samples in an offline setting, such that the digital event data corpus may include historical digital event data samples that may have been collected and stored during a historical period. In some embodiments, S210 may function to collect subscriber digital event data samples in an online or real-time setting, such that a digital event data corpus may include current or real-time subscriber digital event data samples being actively collected by a threat system/threat service implementing the method 200 or the like. In such embodiments, the real-time subscriber digital event data samples may be collected via streams of subscriber data provided via a content or event-specific application programming interface to a threat service or threat system implementing the method 200.

2.20 Intelligently Selecting an Automated Bulk Labeling Algorithm

S220, which includes selecting an automated bulk labeling algorithm, may function to select an automated bulk labeling algorithm from a plurality of distinct automated bulk labeling algorithms based on one or more corpus characteristics and/or one or more corpus metrics associated with a subject digital event data corpus sourced by S210. An automated bulk labeling algorithm, as generally referred to herein, may comprise a set of computer instructions that, when executed, executes an automated sequence of tasks that may include automatically and/or simultaneously assigning at least one classification label to a volume of unlabeled digital event data samples included in a target digital event data corpus or a target duster of digital event data. In one or more embodiments, S220 may function to select an automated bulk labeling algorithm from a plurality of distinct automated bulk labeling algorithms based on one or more corpus characteristics and/or one or more corpus metrics derived from a target digital event data corpus satisfying bulk labeling criteria of the automated bulk labeling algorithm, as shown generally by way of example in FIG. 3.

In one or more embodiments, a distinct set of bulk labeling criteria (or criterion) may be defined for each distinct automated bulk labeling algorithm of the plurality of distinct automated bulk labeling algorithms. For instance, in a non-limiting example, a first distinct set of bulk labeling criteria (or criterion) may be defined for a first automated bulk labeling algorithm and a second distinct set of bulk labeling criteria (or criterion) may be defined for a second automated bulk labeling algorithm. As discussed in more detail herein, S220 may function to (e.g., automatically) select one of a plurality of distinct automated bulk labeling algorithms based on one or more corpus characteristics and/or one or more corpus metric of a target digital event data corpus satisfying bulk labeling criteria (or criterion) of the one of the plurality of distinct automated bulk labeling algorithms.

In one or more embodiments, each of the plurality of distinct automated bulk labeling algorithms may function to simultaneously assign, in bulk, a classification label (e.g., an accept classification label (e.g., indicating not digital abuse), a block classification label (e.g., indicating digital abuse), a watch classification label, or the like) to each of a plurality of unlabeled digital event data samples included in a target digital event data corpus. Additionally, or alternatively, one or more of the plurality of distinct automated bulk labeling algorithms may function to simultaneously assign a digital fraud type classification label or digital abuse type classification label (e.g., an account takeover classification label, credential stuffing classification label, payment abuse classification label, etc.) to each of a plurality of unlabeled digital event data samples included in a target digital event data corpus.

It shall be noted that each of the plurality of automated bulk labeling algorithms (described below) may function to provide capabilities that simultaneously labels digital event data samples (that may correspond to a plurality of subscribers) in bulk, rather than on a subscriber-by-subscriber basis or on an individual digital event data sample basis.

It shall be noted that, in one or more embodiments, selecting and executing an automated bulk labeling algorithm may significantly reduce a (e.g., manual) labeling burden for subscribers subscribing to the digital threat mitigation service (e.g., the system 100) as the automated bulk labeling algorithms underlying the digital threat mitigation service may function to automatically label en masse, a plurality of unlabeled digital event data samples using one or more computers of the digital threat mitigation service.

Automated Connected Component Graph Bulk Labeling Algorithm

In one or more embodiments, based on satisfying bulk labeling criteria (or criterion) of an automated connected component graph bulk labeling algorithm, S220 may function to select the automated connected component graph bulk labeling algorithm for automated bulk (or global) labeling of digital event data samples using a connected component graph that may include a plurality of distinct connected component clusters. A connected component cluster of a connected component graph, as generally referred to herein, may include a plurality of distinct graphical nodes of one or more graphical node types that may be graphically connected by one or more graphical edges based on sharing one or more digital event data attributes. As described in more detail in S230, an automated connected component graph bulk labeling algorithm may function to bulk (or global) label digital event data samples and/or digital event attributes associated with digital event data samples on a per connected component duster basis.

It shall be noted that a connected component cluster may be a relatively small portion of a much broader (e.g., larger) connected component graph that may include a large quantity (e.g., exceeding a threshold value) of distinct connected component clusters, as described in U.S. Patent Application No. 63/192,316, titled SYSTEMS AND METHODS FOR INTELLIGENTLY CREATING A CONNECTED COMPONENT GRAPH AND IDENTIFYING AND MITIGATING DIGITAL THREATS BASED THEREON IN A MACHINE LEARNING TASK-ORIENTED DIGITAL THREAT MITIGATION PLATFORM, which is incorporated in its entirety by this reference.

In one or more embodiments, S220 may function to select an automated connected component graph bulk labeling algorithm based on detecting (or identifying) that a subject digital event data corpus may include a high magnitude (e.g., five or more, ten or more, thirty or more, fifty or more, one-hundred or more, three-hundred or more, or any number) of distinct digital event attribute values of a first type digitally mapped to a single, distinct digital event attribute value of a second type. Stated differently, S220 may function to determine that a corpus characteristic and/or a corpus metric associated with a target digital event data corpus may satisfy a bulk labeling criterion of an automated connected component graph bulk labeling algorithm if a plurality of unlabeled digital event data samples of a target digital event data corpus includes a plurality of distinct digital event attributes of a first type associated with a distinct digital event attribute of a second type.

In one or more embodiments, S220 may function to select an automated connected component graph bulk labeling algorithm for automated bulk (or global) labeling of unlabeled digital event data samples based on detecting (or identifying) that a subject digital event data corpus may include a high magnitude of digital event data samples that include a plurality of distinct user accounts (e.g., a plurality of distinct user identification values exceeding a service-defined threshold, a plurality of distinct user emails exceeding a service-defined threshold, or the like) digitally linked to a single, distinct credit card number.

Additionally, or alternatively, in one or more embodiments, S220 may function to select an automated connected component graph bulk labeling algorithm for automated bulk (or global) labeling of unlabeled digital event data samples based on detecting (or identifying) that a subject digital event data corpus may include a high magnitude of digital event data samples that may be associated with a plurality of distinct user accounts (e.g., a plurality of distinct user identification values exceeding a service-defined threshold, a plurality of distinct user emails exceeding a service-defined threshold, or the like) digitally linked to a single, distinct telephone number.

Additionally, or alternatively, in one or more embodiments, S220 may function to select an automated connected component graph bulk labeling algorithm for automated bulk (or global) labeling of digital event data samples based on detecting or identifying that a subject digital event data corpus may include a high magnitude of digital event data samples that may correspond to a plurality of distinct billing addresses (e.g., a plurality of distinct billing addresses exceeding a service-defined threshold) digitally linked to a single, distinct shipping address.

Additionally, or alternatively, in one or more embodiments, S220 may function to select an automated connected component graph bulk labeling algorithm for automated bulk (or global) labeling of unlabeled digital event data samples based on detecting (or identifying) that a subject digital event data corpus may include a high magnitude of digital event data samples associated with a plurality of distinct user accounts (e.g., a plurality of distinct user accounts exceeding a service-defined threshold) corresponding (e.g., digitally linked) to a single, distinct email address.

Additionally, or alternatively, in one or more embodiments, S220 may function to select an automated connected component graph bulk labeling algorithm for automated bulk (or global) labeling of digital event data samples based on detecting or identifying that at least a subset of the digital event data samples included in a subject digital event data corpus (or a cluster of digital event data) may be of a suspected automated fraud attack (e.g., botnet attack). In other words, in one or more embodiments, S220 may function to determine that a corpus characteristic and/or a corpus metric associated with a target digital event data corpus may satisfy a bulk labeling criterion of an automated connected component graph bulk labeling algorithm if a subset of a plurality of unlabeled digital event data samples of a target digital event data corpus (or a target cluster of digital event data) may correspond to a probable or suspected automated fraud attack.

Automated Digital Event Embeddings-Based Bulk Labeling Algorithm

In one or more embodiments, based on satisfying bulk labeling criteria (or criterion) of an automated digital event embeddings-based bulk labeling algorithm, S220 may function to select an automated embeddings-based bulk labeling algorithm that may function to bulk (or global) label digital event data samples using digital event embeddings. As described in more detail in S230, the automated embeddings-based bulk labeling algorithm may function to compute one or more digital event embeddings vector representation for one or more target digital event activity sequences, query each of the one or more digital event embeddings vector representations against a multi-dimensional embeddings space to identify labeled digital event sequences similar to each of the one or more digital event embeddings vector representations, label each of the one or more target digital event activity sequences based on the querying, and optionally identify a plurality of distinct, unlabeled digital events similar to each of the one or more digital event embeddings vector representations, as described in U.S. Patent Application No. 63/316,703, titled SYSTEMS AND METHODS FOR MACHINE LEARNING-BASED DETECTION OF AN AUTOMATED FRAUD ATTACK OR AN AUTOMATED ABUSE ATTACK, which is incorporated in its entirety by this reference.

In one or more embodiments, S220 may function to select an automated digital event embeddings-based bulk labeling algorithm for automated bulk (or global) labeling of unlabeled digital event data samples based on detecting (or identifying) that a subject digital event data corpus may exceed a corpus size threshold (e.g., the quantity of unlabeled digital events included in the digital event data corpus may exceed a service-defined corpus size threshold value. In other words, in one or more embodiments, S220 may function to determine that a corpus characteristic and/or a corpus metric associated with a target digital event data corpus may satisfy a bulk labeling criterion of an automated digital event embeddings-based bulk labeling algorithm if a target digital event data corpus exceeds a corpus size threshold.

Additionally, or alternatively, in one or more embodiments, S220 may function to select an automated digital event embeddings-based bulk labeling algorithm for automated bulk (or global) labeling of digital event data samples based on detecting (or identifying) that at least a subset of the unlabeled digital event data samples included in a subject digital event data corpus may be of a suspected digital fraud type or probable digital fraud abuse type (e.g., credential stuffing, payment abuse, account takeover, content abuse, promotion abuse, etc.). In other words, in one or more embodiments, S220 may function to determine that a corpus characteristic and/or a corpus metric associated with a target digital event data corpus may satisfy a bulk labeling criterion of an automated digital event embeddings-based bulk labeling algorithm if a plurality of unlabeled digital event data samples of a target digital event data corpus may be of a suspected or probable digital fraud type.

Additionally, or alternatively, in one or more embodiments, S220 may function to select an automated digital event embeddings-based bulk labeling algorithm based on detecting (or identifying) that a magnitude of digital event data samples (e.g., exceeding a service-defined threshold value) included in a subject digital event data corpus may share one or more common digital event attributes (e.g., a high magnitude (e.g., five or more, ten or more, thirty or more, fifty or more, one-hundred or more, three-hundred or more, or any number) of transaction-type digital events may be below a predetermined order amount, a high magnitude (e.g., five or more, ten or more, thirty or more, fifty or more, one-hundred or more, three-hundred or more, or any number) of digital events may be associated with a high volume (e.g., five or more, ten or more, thirty or more, fifty or more, one-hundred or more, three-hundred or more, or any number) of failed login attempts, etc.).

Automated Context-Based Bulk Labeling Algorithm|Dual Influence Labeling

In one or more embodiments, based on satisfying bulk labeling criteria of an automated context-based bulk labeling algorithm, S220 may function to select an automated context-based bulk labeling algorithm for automated bulk (or global) labeling of unlabeled digital event data samples. As described in more detail in S230, an automated context-based bulk labeling algorithm, when executed, may function to derive an automated bulk labeling decision for a plurality of unlabeled digital event data samples of a subject digital event data corpus (or cluster) based on a plurality of labeled digital event data samples that may be included in the subject digital event data corpus (or cluster).

In one or more embodiments, S220 may function to select an automated context-based bulk labeling algorithm for automated bulk (or global) labeling of digital event data samples based on detecting or identifying that a subject digital event data corpus (or cluster) may include a plurality of labeled digital event data samples that may have been manually labeled by a plurality of distinct subscribers using a machine learning-based digital threat mitigation platform of the machine learning-based digital threat mitigation service.

Alternatively, in one or more embodiments, S220 may function to select an automated context-based bulk labeling algorithm for automated bulk (or global) labeling of unlabeled digital event data samples based on detecting (or identifying) that a subject digital event data corpus may include labeled digital event data samples. In other words, in one or more embodiments, S220 may function to determine that a corpus characteristic and/or a corpus metric associated with a target digital event data corpus may satisfy a bulk labeling criterion of an automated context-based bulk labeling algorithm if the target digital event data corpus (or duster) includes a predetermined number of labeled digital event data samples.

Automated Heuristics-Based Bulk Labeling Algorithm

In one or more embodiments, based on satisfying bulk labeling criteria (or criterion) of an automated heuristics-based bulk labeling algorithm, S220 may function to select an automated heuristics-based bulk labeling algorithm that may include a plurality of service-defined digital fraud evaluation heuristics. As described in S230, the automated heuristics-based bulk labeling algorithm, when executed, may function to simultaneously label a plurality of unlabeled digital event data samples based on one or more service-defined digital fraud evaluation heuristics.

In one or more embodiments, S220 may function to select an automated digital event heuristics-based bulk labeling algorithm for automated bulk (or global) labeling of digital event data samples based on detecting or identifying that at least a subset of the digital event data samples included in a subject digital event data corpus (or digital event data sample cluster) may be of a suspected digital fraud type or probable digital fraud abuse type.

Additionally, or alternatively, in one or more embodiments, S220 may function to select an automated digital event heuristics-based bulk labeling algorithm for automated bulk (or global) labeling of digital event data samples based on detecting (or identifying) that a subject digital event data corpus (or digital event data sample cluster) may exceed a corpus size threshold (e.g., the quantity of unlabeled digital events included in the digital event data corpus exceeds a service-defined threshold value).

Targeted Digital Event Bulk Labeling Algorithm|Active Learning

In one or more embodiments, based on satisfying bulk labeling criteria (or criterion) of a targeted digital event-based bulk labeling algorithm, S220 may function to select the targeted digital event-based bulk labeling algorithm from a plurality of automated bulk labeling algorithms. As described in more detail in S230, the automated digital event-based bulk labeling algorithm may function to selectively identify a probative set of digital event data samples from a subject digital event data corpus or digital event data sample cluster for automated and/or directed labeling. Accordingly, the probative set of digital event data samples may include a plurality of digital event data samples that may have been near (e.g., within a threshold distance) or on one or more decision boundaries of the one or more machine learning-based digital threat scoring models underlying the system or service 100.

In one or more embodiments, S220 may function to select the targeted digital event-based bulk labeling algorithm based on detecting that a predictive accuracy level of one or more machine learning-based models of the system 100 may be below a predetermined accuracy threshold value.

In one or more embodiments, S220 may function to select the targeted digital event-based bulk labeling algorithm based on detecting that one or more of the plurality of machine learning-based models of the system 100 may be experiencing anomalous behavior (e.g., one of the plurality of machine learning models may have a drifting behavior, one of the plurality of machine learning models may have a shifting behavior, etc.), as described in U.S. Patent Application No. 63/254,464, titled SYSTEMS AND METHODS FOR INTELLIGENT EVALUATION OF THREAT SCORING ENSEMBLES AND INTELLIGENT GENERATION OF ANOMLAOUS ARTIFACTS FOR ANOMALOUS ARTIFACTS FOR ANOMALOUS ENSEMBLES, which is incorporated in its entirety by this reference.

2.30 Executing an Automated Bulk Labeling Algorithm

S230, which includes executing an automated bulk labeling algorithm, may function to execute, by one or more computers of the digital threat mitigation service, the automated bulk labeling algorithm selected by S220. In one or more preferred embodiments, S230 function to execute the selected automated bulk labeling algorithm against a subject digital event data corpus (or a subject duster of digital event data samples) sourced or constructed by S210 causing an automated bulk labeling action to (at least) a subset of the plurality of unlabeled digital event data samples included in the subject digital event data corpus (or the duster of digital event data samples).

In one or more embodiments, prior to executing the selected automated bulk labeling algorithm or during an execution of the selected bulk labeling algorithm, the system or service implementing the method 200 may function to optionally evaluate a subset of unlabeled digital event data samples included in a subject digital event data corpus sourced by S210 or a subject cluster of digital event data samples. In one or more embodiments, the subset of unlabeled digital event data samples may be identified by random sampling a predetermined quantity of unlabeled digital event data samples from the subject digital event data corpus, and the system or service implementing the method 200 may function to attribute a distinct classification label to each unlabeled digital event data sample of the subset. For instance, in a non-limiting example, the system or service (implementing the method 200) may function to attribute one of a first classification label indicating digital abuse or a second classification label indicating not digital abuse to each unlabeled digital event data sample included in the subset.

Automated Connected Component Graph Bulk Labeling Algorithm

In one or more embodiments, based on executing an automated connected component graph bulk labeling algorithm, S230 may function to source a connected component graph and may optionally function to display the connected component graph on a web-based user interface of the digital threat mitigation service. In one or more embodiments, the sourced connected component graph may include a plurality of distinct connected component dusters that may collectively define a structure (or shape) of the connected component graph. It shall be noted that one of the plurality of distinct connected component clusters of the connected component graph may include a portion of the digital event data samples included in the digital event data corpus sourced by S210 and/or the entirety of the digital event data samples included in the digital event data corpus (e.g., the digital event data corpus may be in the form of a connected component cluster on the connected component graph).

In one or more embodiments, one or more connected component clusters of the connected component graph may include a plurality of distinct graphical nodes of one or more graphical node types that may be graphically connected by a plurality of graphical edges. In such embodiments, a connected component cluster of the connected component graph may include one or more user-type graphical nodes, one or more order-type graphical nodes, one or more address-type graphical nodes, one or more internet protocol address-type graphical nodes, one or more phone number-type graphical nodes, one or more email-type graphical nodes, and/or one or more credit card-type graphical nodes. Each graphical node of the connected component graph may be encoded with (or may be configured to store) a distinct value or property corresponding to the graphical node type (e.g., a distinct user-type graphical node may be encoded with a distinct user ID, a distinct phone number-type graphical node may correspond to a distinct phone number, etc.).

In one or more embodiments, S230 may function to identify a target connected component cluster based on searching or querying the connected component graph with one or more target digital event attributes (e.g., a phone number, an email address, an IP address, etc.) derived from a subject digital event data corpus. That is, the target connected component duster may be identified or returned based on the search or query because the one or more target digital event attributes may be included in the target connected component cluster. It shall be noted that in such implementation, the target connected component cluster may optionally be displayed on a web-based user interface of the digital threat mitigation service and may include a connected representation of digital event data associated with a single subscriber or a plurality of distinct subscribers.

In one or more embodiments, in response to identifying a target connected component cluster, S230 may function to randomly sample a subset of graphical nodes (e.g., a plurality of labeled graphical nodes, a plurality of unlabeled graphical nodes, combinations thereof, and the like) from the target connected component cluster and attribute a distinct classification label indicating one of digital abuse or not digital abuse to each graphical node of the subset of graphical nodes.

Accordingly, in response to identifying the distinct classification label attributed to each graphical node included in the subset of graphical nodes, S230 may function to simultaneously assign a classification label (equivalent to the distinct classification label attributed to the subset) to each of the plurality of unlabeled graphical nodes included in the target connected component cluster (e.g., an extrapolated superset). Alternatively, in response to identifying the distinct classification label attributed to each graphical node of the subset, S230 may function to simultaneously assign a classification label (equivalent to the classification label attributed to the subset) to each of the plurality of graphical nodes included in the target connected component cluster (e.g., an extrapolated superset) irrespective of if the target connected component duster may have included one or more of graphical nodes that may be associated with a pre-existing equivalent classification label or a pre-existing non-equivalent classification label.

It shall be noted that simultaneously assigning a classification label to a plurality of graphical nodes included in a target connected component cluster may include simultaneously assigning a classification label to each of the plurality of distinct digital event attribute values encoded or stored within each of the plurality of graphical nodes included in the target connected component duster. For instance, in response to assigning a classification label to a target graphical node, S240 may function to simultaneously assign an equivalent classification label to each distinct user-type graphical node, each distinct order-type graphical node, each distinct address-type graphical node, each distinct internet protocol address-type graphical node, each distinct email-type graphical node, and/or each distinct credit card-type graphical node graphically connected to the target graphical node.

As will be described in more detail in S240, the system implementing the method 200 may function to optionally expose the automated bulk labeling action performed by the automated connected component graph bulk labeling algorithm to a subscriber and/or an internal (human) resource of the system 100 for confirming or disconfirming the digital event data samples labeled by the automated bulk labeling action.

Automated Digital Event Embeddings-Based Bulk Labeling Algorithm

In one or more embodiments, based on executing an automated digital event embeddings-based bulk labeling algorithm, S230 may function to generate a digital event embeddings vector representation for a target digital event sequence based on passing, as input, a target digital event sequence to a neural network machine learning model (e.g., Deep Neural Network, Convolutional Neural Network, Long Short-Term Memory Neural Network, or the like) that may be trained to compute digital event embeddings vector representations. Additionally, in one or more embodiments, the automated digital event embeddings-based bulk labeling algorithm may function to query a multi-dimensional embeddings space that may include a volume of distinct classified or labeled digital event sequence embeddings or vectors based on the embedded vector representation of the target digital event sequence.

In one or more embodiments, the multi-dimensional space that may include a volume of distinct classified or labeled digital event sequence embedding signatures or vectors may include a plurality of distinct clusters of digital event sequences such that each of the plurality of distinct clusters may include a plurality of identical or substantially similar digital event sequence embeddings. In such embodiments, in response to generating a digital event sequence embeddings, the automated digital event embeddings-based bulk labeling algorithm may function to query the plurality of distinct clusters of digital event sequences with the digital event sequence embeddings to identify one or more clusters that may include one or more digital event sequences identical to the digital event sequence embeddings and/or one or more digital event sequences that may be substantially similar to the digital event sequence embeddings.

Stated another way, through digital event embeddings, S230 may function to intelligently identify dusters of digital event activity sequences similar to a target digital event embedded vector representation to discover similar digital events (or digital event sequences) within a threshold value. Accordingly, the automated digital event embeddings-based bulk labeling algorithm may function to label the digital event data sequence with a classification label indicating digital abuse if one or more of the plurality of distinct clusters of digital event sequence data having a digital abuse label is returned based on the query (e.g., in response to the querying, a plurality of digital abuse clusters may be returned that include known, fraudulent digital event sequences), or a classification label indicating not digital abuse if one or more of the plurality of distinct clusters of digital event sequence data that may have a not digital abuse label is returned based on the query Additionally, or alternatively, to prevent context switching (e.g., changing tasks) for a human labeling analyst, a system (e.g., the system 100) implementing the method 200, may function to provide (or surface) to a human labeling analyst similar digital events (e.g., similar digital users, similar digital orders, similar digital content, similar digital event sessions, etc.) to the target digital event embedded vector representation for more efficient (e.g., bulk) labeling.

Automated Context-Based Bulk Labeling Algorithm|Dual Influence Labeling

In one or more embodiments, based on executing an automated context-based bulk labeling algorithm, S230 may function to execute a bulk labeling action directed to a plurality of unlabeled digital event data samples in a digital event data corpus based on the labeled digital event data samples that may be included in the digital event data corpus. In one or more embodiments, a subject digital event data corpus and/or a target cluster of digital event data may include a plurality of digital event data samples that may have been manually labeled by one or more subscribers and a plurality of unlabeled digital event data samples. Accordingly, the automated context-based bulk labeling algorithm may function to determine that each of the plurality of digital event data samples labeled by the one or more subscribers correspond to a single classification label type (e.g., all digital events are labeled with a classification label indicating digital abuse) and based on the determination, S230 may function to assign a classification label indicating digital abuse to the plurality of unlabeled digital event data samples included in the target digital event data corpus and/or the target cluster of digital event data.

In one or more embodiments, S230 may function to provide a gateway or channel for a system (e.g., the system 100 implementing the method 200) to monitor and/or identify subscriber labeling actions (e.g., subscribers manual labeling their own data in the digital threat mitigation platform). For example, in one or more embodiments, the subscriber (or the customer) utilizing the system 100 and/or the method 200 may opt to label at least digital event (or digital event data sample) that may be occurring on an online resource associated with the subscriber.

Accordingly, the system 100 and/or the method 200 may function to identify and/or monitor for subscriber-generated labels. For instance, in one or more embodiments, one or more (or a plurality of subscribers) may label and flag one or more IP addresses (and/or a network of IP addresses) as malicious due to one or more fraudulent digital events. Thereafter, the system 100 and/or the method 200 may function to cross-reference and/or search the malicious IP addresses that occurred locally within the respective subscriber environment(s) to all subscribers (e.g., all customers) utilizing the system 100 and/or the method 200 to identify a plurality (e.g., all) digital events associated with that malicious IP address and simultaneously assign, in bulk, a classification label indicating digital abuse to each of the plurality of digital events.

In one or more embodiments, the system 100 and/or the method 200 may function to identify and flag one or more IP addresses (or a network of IP addresses) as suspicious within a subscriber-specific environment. Thereafter, in one or more embodiments, the system 100 and/or the method 200 may function to cross-reference and/or search the malicious IP addresses that occurred within the respective subscriber-specific environment to all subscribers (e.g., all customers/subscribers, a plurality of customers/subscribers) utilizing the system 100 and/or the method 200 to identify a superset of digital events associated with the malicious IP addresses and simultaneously assign, in bulk, a classification label indicating digital abuse to each digital event in the superset and/or at least intelligently notify other subscribers (distinct from the original subscriber) to be aware of the one or more malicious IP addresses.

At least one technical advantage of executing the automated context-based bulk labeling algorithm may increase a labeling efficiency of digital events between the system 100 (implementing the method 200) and a plurality of subscribers by reducing individual digital event data sample labeling.

Automated Digital Event Heuristics-Based Bulk Labeling Algorithm

In one or more embodiments, based on executing an automated digital event heuristics-based bulk labeling algorithm, S230 may function to execute a bulk labeling action based in part on one or more service-defined fraud evaluation heuristics. In one or more embodiments, a subject digital event data corpus and/or a target duster of digital event data may include a plurality of unlabeled digital event data samples that the automated digital event heuristics-based bulk labeling algorithm may be executed against.

In one or more embodiments, executing the automated digital event heuristics-based bulk labeling algorithm against a subject digital event data corpus and/or a target duster of digital event data may include evaluating the digital event data samples or sequences of digital event data samples included in the subject digital event data corpus (and/or the target cluster) against a plurality of service-defined fraud evaluation heuristics. In a non-limiting example, one of a plurality of service-defined fraud evaluation heuristic may be if a subject user account has a specified number (e.g., one hundred) login failures within a predetermined time period (e.g., five minutes) label as credential stuffing, or the like), and thus the digital event data samples (or digital event sequences) may be evaluated against the plurality of service-defined fraud evaluation heuristics and (e.g., automatically) assigned a corresponding label based on satisfying a corresponding service-defined fraud evaluation heuristic.

In other words, rules and/or heuristics that apply to all (or a majority of) subscribers may allow for global (or bulk) labeling that may reduce emphasis on readily apparent fraud types (e.g., credential stuffing, payment abuse, account takeover, or the like) and permit the system 100 (implementing the method 200) and/or an internal resource augmenting the system to focus on more nuanced digital event labeling cases.

Targeted Digital Event Bulk Labeling Algorithm|Active Learning

In one or more embodiments, the targeted digital event-based bulk labeling algorithm may function to selectively identify a subset of (e.g., unlabeled) digital event data samples from one or more corpora of digital event data samples and label the subset of unlabeled digital event data samples, as described in U.S. Patent Application No. 63/274,835, titled SYSTEMS AND METHODS FOR AN ADAPTIVE SAMPLING OF UNLABELED DATA SAMPLES FOR CONSTRUCTING AN INFORMATIVE TRAINING DATA CORPUS THAT IMPROVES A TRAINING AND PREDICTIVE ACCURACY OF A MACHINE LEARNING MODEL, which is incorporated in its entirety by this reference In one or more embodiments, a machine learning-based model of the system 100 may initiate a request to the system 100 (implementing the method 200) and/or to a human labeling analyst to provide labeled digital event data samples of specified types of digital threats and/or of a predetermined range of threat scores (e.g., 50-70, 55-75, 60-65, etc.) where more guidance and training data may be beneficial to the machine learning-based model. In such embodiments, the machine learning-based model may inform one of the human labeling analyst(s), the system 100, and/or the method 200 characteristics of its current decision boundary and limitations. Thereafter, one of the human labeling analysts, the system 100, and/or the method 200 may function to provide labeled digital event data that may be used to beneficially train the machine learning model where the model stalls (e.g., along the decision boundary, within a specific range of threat scores, and/or particular types of fraud) to reduce the need for manual review and/or involving a human labeling analyst (e.g., decreasing case-by-case basis).

It shall be noted that at least one technical advantage of S230 assigning a classification label to a plurality of digital event attribute values (e.g., a plurality of distinct users, a plurality of distinct IP addresses, etc.) may prevent future digital events that may that may be associated with one or more of the plurality of digital event attributes from being processed to completion on one or more online resources of one or more subscribers to the digital threat mitigation service (e.g., prevents malicious IP addresses and/or malicious users from placing an order on one or more online resources of the subscriber for a period of time). Additionally, S230 may function to generate one or more corpora of labeled digital event data samples based on executing an automated bulk labeling algorithm to train and/or update machine learning-based models of the system 100 to improve threat predictions thereof.

2.40 Verifying Service or System-Labeled Digital Event Data

Optionally, S240, which includes verifying service or system-labeled digital event data samples, may function to surface (or expose) a pending bulk labeling action and/or an executed bulk labeling action to one or more target subscribers for confirming or disconfirming a pending or executed bulk labeling action. In one or more embodiments, S240 may function to display, on a web-based user interface of the digital threat mitigation service, a list of digital event data samples corresponding to a target subscriber and a classification label assigned to each digital event data sample via the bulk labeling action. This is, S240 may function to advise one or more subscribers pre- or post-labeling of a label activity occurring within the environment of the one or more target subscribers and undertaken by the system 100 and/or the method 200 to appropriately label.

It shall be noted that digital activity occurring within one environment of the subscriber may be viewed differently by another subscriber (e.g., a first subscriber may determine digital activity associated with a subject digital user or subject digital event may be fraudulent, while a second subscriber may determine that the same activity associated with the subject digital user or the subject digital event may not be fraudulent. Accordingly, in one or more embodiments, to ensure that the executed automated bulk labeling algorithm appropriately labeled each digital event (or digital event sequence), S240 may function to surface digital event data samples and the corresponding classification label to a target subscriber to verify (e.g., confirm or disconfirm) an automated (bulk) labeling action by the executed bulk labeling algorithm. In other words, the system 100 (implementing the method 200) may function to (e.g., automatically) label one or more characteristics of unlabeled digital event data samples via a global (or bulk) labeling technique and surface the labeling to a target subscriber for review.

In one or more embodiments, S230 may function to simultaneously label a plurality digital event data samples that may correspond to a plurality of distinct subscribers. Accordingly, when displaying labeled digital event data samples to a target subscriber on a web-based user interface, S240 may function to display only subscriber-specific digital event label data by anonymizing and/or filtering out non-subscriber digital event data samples (e.g., data not directly corresponding to the target subscriber) by screening, anonymizing, or removing the non-subscriber specific digital event data.

3. Method for Machine Learning-Based Content Clustering, Content Threat Detection/Assessment, and Content Threat Remediation The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for accelerating an automated labeling of a volume of unlabeled digital event data samples, the method comprising:
   identifying one or more corpus characteristics or one or more corpus metrics of a digital event data corpus comprising a plurality of distinct unlabeled digital event data samples;
   selecting an automated bulk labeling algorithm of a plurality of distinct automated bulk labeling algorithms based on the one or more corpus characteristics or the one or more corpus metrics satisfying a bulk labeling criterion associated with one of the plurality of distinct automated bulk labeling algorithms;
   evaluating a subset of the plurality of distinct unlabeled digital event data samples, wherein evaluating the subset of the plurality of distinct unlabeled digital event data samples includes attributing a distinct classification label of a plurality of distinct classification labels to each distinct unlabeled digital event data sample of the subset;
   converting the subset of the plurality of distinct unlabeled digital event data samples to a subset of distinct labeled digital event data samples based on the attribution of the distinct classification label; and
   in response to the selection, executing, by one or more computers, the selected automated bulk labeling algorithm against the digital event data corpus, wherein the executing includes:
   (a) identifying the distinct classification label attributed to the subset of distinct labeled digital event data samples;
   (b) simultaneously assigning a classification label equivalent to the distinct classification label to an extrapolated superset of the plurality of distinct unlabeled digital event data samples of the digital event data corpus, wherein each distinct unlabeled digital event data sample of the extrapolated superset shares at least one common digital event data attribute with each distinct labeled digital event data sample of the subset;
   (c) converting the extrapolated superset of the plurality of distinct unlabeled digital event data samples to a superset of distinct labeled digital event data samples based on the attribution of the distinct classification label; and
   (d) constructing a labeled digital event data corpus based on a combination of (1) the extrapolated superset of distinct labeled digital event data samples and (2) the superset of distinct labeled digital event data samples.

2. The method according to claim 1, wherein each of the plurality of distinct automated bulk labeling algorithms includes a set of computer-executable instructions that, when executed, executes an automated sequence of tasks that automatically assigns at least one classification label to each digital event data sample of a volume of digital event data samples or a target corpus of digital event data samples.

3. The method according to claim 1, wherein:
the one or more corpus characteristics or the one or more corpus metrics associated with the digital event data corpus satisfies the bulk labeling criterion of an automated connected component graph bulk labeling algorithm, and
the bulk labeling criterion is satisfied based on determining that a collection of the plurality of distinct unlabeled digital event data samples comprise a plurality of distinct digital event attribute values of a first type that are digitally linked to a distinct digital event attribute value of a second type.

4. The method according to claim 1, wherein:
the one or more corpus characteristics or the one or more corpus metrics associated with the digital event data corpus satisfies the bulk labeling criterion of an automated connected component graph bulk labeling algorithm, and
the bulk labeling criterion is satisfied based on the plurality of distinct unlabeled digital event data samples of the digital event data corpus corresponding to a suspected automated fraud attack.

5. The method according to claim 1, wherein
the one or more corpus characteristics or the one or more corpus metrics associated with the digital event data corpus satisfies the bulk labeling criterion of an automated digital event embeddings-based bulk labeling algorithm, and
the bulk labeling criterion is satisfied based on the plurality of distinct unlabeled digital event data samples of the digital event data corpus corresponding to a probable digital abuse type.

6. The method according to claim 1, wherein
the one or more corpus characteristics or the one or more corpus metrics associated with the digital event data corpus satisfies the bulk labeling criterion of an automated digital event embeddings-based bulk labeling algorithm, and
the bulk labeling criterion is satisfied based on the digital event data corpus exceeding a predetermined corpus size threshold.

7. The method according to claim 1, wherein
the digital event data corpus includes:
   a first set of unlabeled digital event data samples corresponding to a first distinct subscriber of a machine learning-based digital threat mitigation service; and
   a second set of labeled digital event data samples corresponding to a second distinct subscriber of the machine learning-based digital threat mitigation service.

8. The method according to claim 7, wherein
the one or more corpus characteristics or the one or more corpus metrics associated with the digital event data corpus satisfies the bulk labeling criterion of an automated context-based bulk labeling algorithm, and
the bulk labeling criterion is satisfied based on the digital event data corpus comprising a plurality of labeled digital event data samples that exceeds a service-defined threshold value.

9. The method according to claim 1, wherein
one of the one or more corpus characteristics satisfying the bulk labeling criterion corresponds to a suspected digital fraud type characteristic.

10. The method according to claim 1, wherein
the automated bulk labeling algorithm includes an automated connected component graph bulk labeling algorithm that updates a connected component graph based on the digital event data corpus, wherein the connected component graph includes:

(i) a plurality of distinct connected component clusters, wherein at least one of the plurality of distinct connected component clusters includes:
(i-a) a plurality of distinct user nodes, wherein each distinct user node of the plurality of distinct user nodes corresponds to a distinct user identification value derived from the digital event data corpus; and
(i-b) a plurality of distinct internet protocol-based edges that graphically connects one or more pairs of distinct user nodes together via one or more of the plurality of distinct internet protocol-based edges.

11. The method according to claim 10, wherein
evaluating the subset of the digital event data corpus includes evaluating a subset of one of the plurality of distinct connected component clusters of the connected component graph; and
evaluating the subset of the one of the plurality of distinct connected component clusters further includes:
displaying, on a web-based user interface of the machine learning-based digital threat mitigation service, the one of the plurality of distinct connected component dusters of the connected component graph, and
while displaying the one of the plurality of distinct connected component clusters of the connected component graph, attributing the distinct classification label to a distinct subset of the plurality of distinct user nodes of the one of the plurality of distinct connected component clusters.

12. The method according to claim 1, wherein
the automated bulk labeling algorithm includes a connected component graph algorithm that updates a connected component graph based on the digital event data corpus;
the connected component graph includes a plurality of distinct connected component dusters, wherein each distinct connected component cluster of the plurality of distinct connected component clusters includes a representation of a plurality of unlabeled digital event data samples graphically connected together;
the evaluating the subset of the digital event data corpus includes evaluating a subset of one of the plurality of distinct connected component dusters; and
the method further includes:
displaying, on a web-based user interface of the machine learning-based digital threat mitigation service, the one of the plurality of distinct connected component dusters, and
while displaying the one of the plurality of distinct connected component clusters, attributing the distinct classification label to each unlabeled digital event data sample included in the subset of the one of the plurality of distinct connected component dusters.

13. The method according to claim 1, wherein
the constructed labeled digital event data corpus comprising a training data corpus for training at least one distinct digital fraud or digital abuse machine learning model, and
the method further comprising:
training the at least one distinct digital fraud or digital abuse machine learning model of a machine learning-based digital threat mitigation service with batches of labeled training data samples sourced from the constructed labeled digital event data corpus.

14. The method according to claim 1, further comprising displaying, on a web-based user interface of the machine learning-based digital threat mitigation service, one or more selective subsets of labeled digital event data samples sourced from the labeled digital event data corpus, wherein the displaying includes only displaying the one or more selective subsets of labeled digital event data samples that corresponds to a target subscriber accessing the web-based user interface; and
while displaying the one or more selective subsets of labeled digital event data samples sourced from the labeled digital event data corpus, receiving a subscriber verification data signal from the target subscriber confirming or disconfirming the classification label assigned to the one or more selective subsets of labeled digital event data samples by the automated bulk labeling algorithm.

15. A method for accelerating an automated labeling of a volume of unlabeled digital event data samples:
computing one or more corpus metrics of a digital event data corpus comprising a plurality of distinct unlabeled digital event data samples, wherein at least one of the one or more computed corpus metrics informs a probable degree of digital fraud risk associated with the digital event data corpus;
selecting an automated bulk labeling algorithm of a plurality of distinct automated bulk labeling algorithms based on the one or more corpus metrics satisfying a bulk labeling criterion associated with one of the plurality of distinct automated bulk labeling algorithms;
in response to selecting the automated bulk labeling algorithm, executing, by one or more computers, the selected automated bulk labeling algorithm against the digital event data corpus, wherein the executing includes:
(a) simultaneously assigning to each distinct unlabeled digital event data sample of the plurality of distinct unlabeled digital event data samples of the digital event data corpus, a classification label of one of (i) a first label indicating digital abuse based on the probable degree of digital fraud risk satisfying a predetermined threat threshold value and (ii) a second classification label indicating not digital abuse based on the probable degree of digital fraud risk not satisfying the predetermined threat threshold value; and
(b) constructing a labeled digital event data corpus that includes the plurality of distinct unlabeled digital event data samples and the classification label corresponding to each of the plurality of distinct unlabeled digital event data samples.

16. The method according to claim 15, wherein
the automated bulk labeling algorithm includes an automated connected component graph bulk labeling algorithm that includes a connected component graph, wherein the connected component graph includes a plurality of distinct connected component dusters;
computing the one or more corpus metrics includes computing one or more connected component duster metrics for at least one distinct connected component cluster of the plurality of distinct connected component dusters; and the method further includes:
  displaying, on a web-based user interface of the machine learning-based digital threat mitigation service, the at least one distinct connected component cluster and the one or more connected component duster metrics corresponding to the at least distinct connected component cluster; and
  while displaying the at least one distinct connected component cluster and the one or more connected component cluster metrics, simultaneously assigning the classification label to a plurality of unlabeled digital event data samples included in the at least one distinct connected component cluster.

17. The method according to claim 16, wherein
the at least one distinct connected component cluster corresponds to a plurality of distinct subscribers of a machine learning-based digital threat mitigation service.

18. The method according to claim 15, further comprising:
  receiving a verification data signal from a target subscriber confirming or disconfirming a bulk labeling action associated with the execution of the automated bulk labeling algorithm.

19. A method for accelerating an automated labeling of a volume of unlabeled data samples, the method comprising:
  identifying one or more corpus characteristics or one or more corpus metrics of a data corpus comprising a plurality of distinct unlabeled data samples;
  selecting an automated bulk labeling algorithm of a plurality of distinct automated bulk labeling algorithms based on the one or more corpus characteristics or the one or more corpus metrics satisfying a bulk labeling criterion associated with one of the plurality of distinct automated bulk labeling algorithms;
  evaluating a subset of the plurality of distinct unlabeled data samples, wherein evaluating the subset of the plurality of distinct unlabeled data samples includes attributing a distinct classification label of a plurality of distinct classification labels to each distinct unlabeled data sample within the subset; and
  in response to the selection, executing, by one or more computers, the selected automated bulk labeling algorithm against the data corpus, wherein the executing includes:
    (a) identifying the distinct classification label attributed to each distinct unlabeled data sample within the subset;
    (b) assigning, in bulk, a classification label equivalent to the distinct classification label to a plurality of distinct unlabeled data samples of an extrapolated superset of the data corpus based on a relationship between the plurality of distinct unlabeled data samples of subset and the plurality of distinct unlabeled data samples of the extrapolated superset; and
    (c) constructing a labeled training data corpus that includes data samples of the subset and data samples of the extrapolated superset that have the assigned classification label, wherein the labeled training data corpus is implemented in one or more training stages of a target machine learning model.

20. The method according to claim 19, wherein each of the plurality of distinct automated bulk labeling algorithms includes a distinct automated sequence of actions that, when executed, executes the distinct automated sequence of actions that automatically assigns at least one classification label to each data sample of a target volume of data samples or a target corpus of data samples.

* * * * *